United States Patent [19]

Häuslein

[11] Patent Number: 4,983,412

[45] Date of Patent: Jan. 8, 1991

[54] METHOD AND DEVICE FOR PRODUCING AQUEOUS EXTRACTS FROM COFFEE

[75] Inventor: Reinhard Häuslein, Minden, Fed. Rep. of Germany

[73] Assignee: Melitta-Werke Bentz & Sohn, Minden, Fed. Rep. of Germany

[21] Appl. No.: 192,028

[22] Filed: May 9, 1988

Related U.S. Application Data

[63] Continuation-in-part of Ser. No. 135,371, Dec. 21, 1987, Pat. No. 4,779,520.

[30] Foreign Application Priority Data

Dec. 22, 1986 [DE] Fed. Rep. of Germany ....... 3643879
May 7, 1987 [DE] Fed. Rep. of Germany ....... 3715165

[51] Int. Cl.$^5$ .......................... A23F 5/00; A47J 31/00
[52] U.S. Cl. ........................ 426/238; 99/287; 99/295; 426/433; 426/519

[58] Field of Search .......... 426/433, 238, 519; 99/287, 295, 300, 304, 307

[56] References Cited

U.S. PATENT DOCUMENTS 4,226,175 10/1980 Sandor .............................. 99/287

*Primary Examiner*—George Yeung
*Attorney, Agent, or Firm*—Spencer & Frank

[57] ABSTRACT

A method for producing aqueous extracts from ground coffee, by adding coffee to a vessel; adding heated water to the vessel; stirring the resulting coffee-water mixture during a predetermined brewing time to produce an even distribution of coffee in the mixture and to allow expulsion of gas from the mixture; and filtering the coffee-water mixture at the end of the predetermined brewing time to produce a filtered aqueous coffee extract.

17 Claims, 3 Drawing Sheets

METHOD AND DEVICE FOR PRODUCING AQUEOUS EXTRACTS FROM COFFEE

CROSS-REFERENCE TO RELATED APPLICATION

This is a continuation-in-part of application Ser. No. 135,371 filed on Dec. 21st, 1987, now U.S. Pat. No. 4,779,520.

FIELD OF THE INVENTION

The present invention relates to a method and device for producing aqueous extracts from coffee, in which hot water is poured over ground coffee, and the water is filtered out as extract after a predetermined brewing time to allow the associated uptake of aromatic substances from the coffee.

TECHNOLOGY REVIEW

In previous methods used for the production of extracts from coffee, hot water is poured over the ground coffee and is allowed to immediately run out as extract from the vessel which contains the ground coffee and an appropriate filter.

With this type of process, the freshness of the extract is short-lived. That is, this type of extract loses a considerable amount of its flavor after only a short period of standing.

SUMMARY OF THE INVENTION

It is our object of the present invention to provide a device and method which make possible the economical production of long-lasting extracts from coffee.

This object and others to become apparent as the specification progresses, are accomplished by the invention, according to which, briefly stated, heated water is poured over ground coffee, in a vessel; the resulting coffee-water mixture is stirred during a predetermined brewing time to produce an even distribution of coffee in the mixture and to allow expulsion of gas from the mixture; and the coffee-water mixture is filtered at the end of the predetermined brewing time to produce a filtered aqueous coffee extract.

It has been found that by using this method an extract is obtained which, even after prolonged storage time, does not lose its pleasant taste. This is due to the stirring action of the process which causes degassing of the liquid, removing some volatile substances such as $CO_2$ from the extract that would otherwise shorten its storage life.

The vessel itself need not have a separate outlet. After extraction, the obtained extract can be transferred to a separate container by pouring and filtering the mixture. However, it is also conceivable to equip the vessel with an outlet and to provide the outlet with a controllable outlet valve.

DESCRIPTION OF THE PREFERRED EMBODIMENTS

Figure 1:
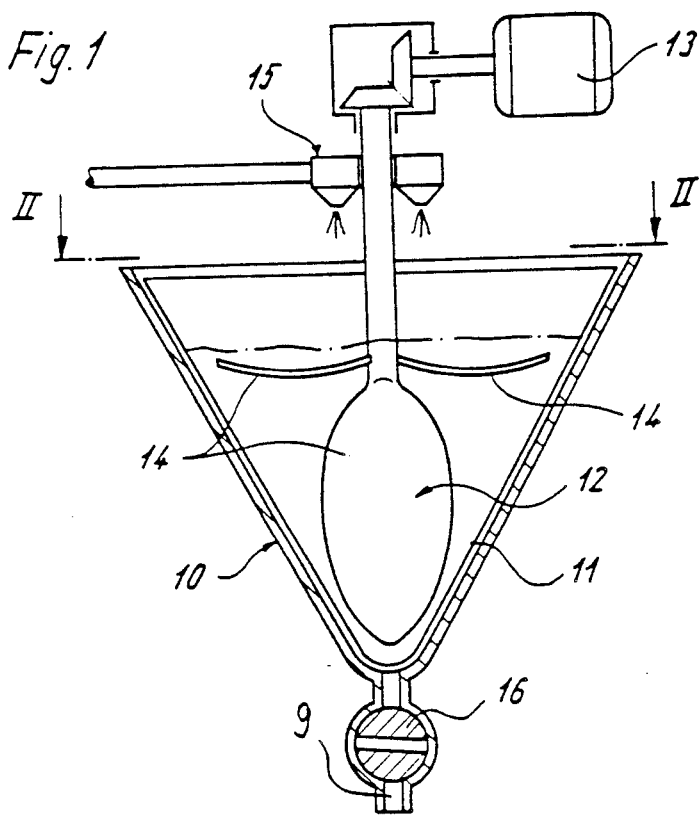
FIG. 1 is a schematic sectional side elevational view of a device for production of aqueous extracts from coffee, according to a preferred embodiment of the invention.
Figure 2:
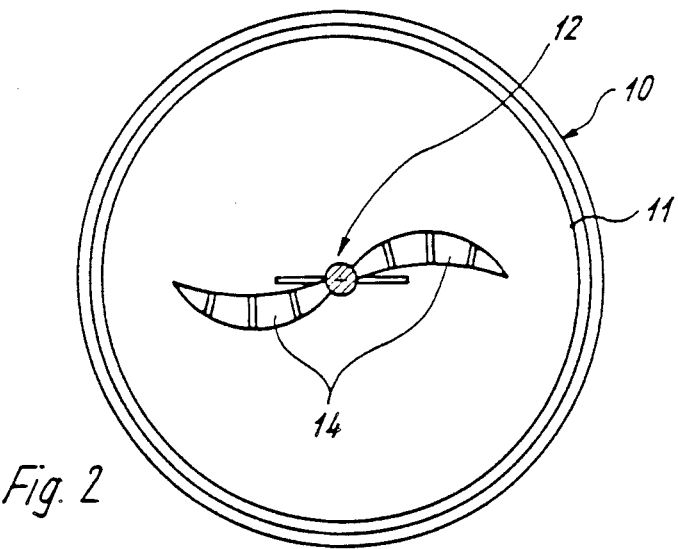
FIG. 2 is a sectional view along line II—II of FIG. 1.

In FIG. 1, a filter vessel 10 is shown which receives an appropriately shaped paper filter 11. Ground coffee is placed into the paper filter 11.

An agitator mechanism 12 extends into the interior of the filter vessel 10, the agitator being able to be rotated by means of a motor 13.

An appropriate design of the driving mechanism can, in addition, provide the possibility of moving the agitator mechanism 12 up and down in the direction of its rotational axis.

Agitator fins 14 have faces which are fluid mechanically shaped in such a way that bubbles are produced during stirring.

A hot water feed 15 through which hot water can be introduced into the filter vessel 10 is attached above the filter vessel 10.

At the bottom of the filter vessel 10 is an outlet 9 which is provided with a shut-off valve 16, shown in its closed position in FIG. 1.

To use the above-described device for producing storable, aroma-stabilized extracts from coffee, hot water is added from the hot water feed 15 after a predetermined amount of ground coffee is placed into the paper filter 11, at the same time setting the agitator mechanism 12 into action. The agitator mechanism 12 ensures regular stirring of the ground coffee which results in thorough removal of gas from the coffee and, consequently, a reduction of the acid content. Removal of carbon dioxide is effected, thereby enabling the obtained extract to be subjected, in a cold (refrigerated) state as well as at room temperature, to a prolonged storage period without aroma loss which up until now has been associated with storing coffee.

At the end of a predetermined brewing time and the associated uptake of aroma substances from the coffee, the mixture is filtered by opening the shut-off valve 16. The aqueous extract is then received by a collecting vessel (not shown).

It is possible to add the entire amount of hot water for the desired extract at one time, or in several separate portions and to let each portion soak the ground coffee followed by separate filtrations.

With the above-described device and method it is possible to produce both an aqueous extract of coffee of drinkable strength or a relatively strong extract, which can be reduced to a drinkable strength just before consumption. In both cases, the extracts obtained will keep over a prolonged period of time without a loss of flavor.

Figure 3:
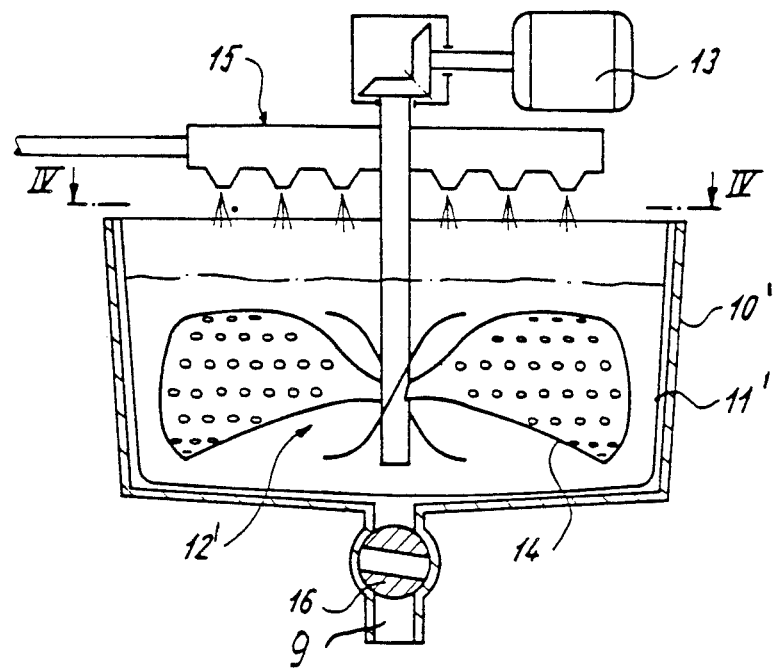
FIG. 3. is a schematic side elevational view of a device according to another preferred embodiment of the invention.
Figure 4:
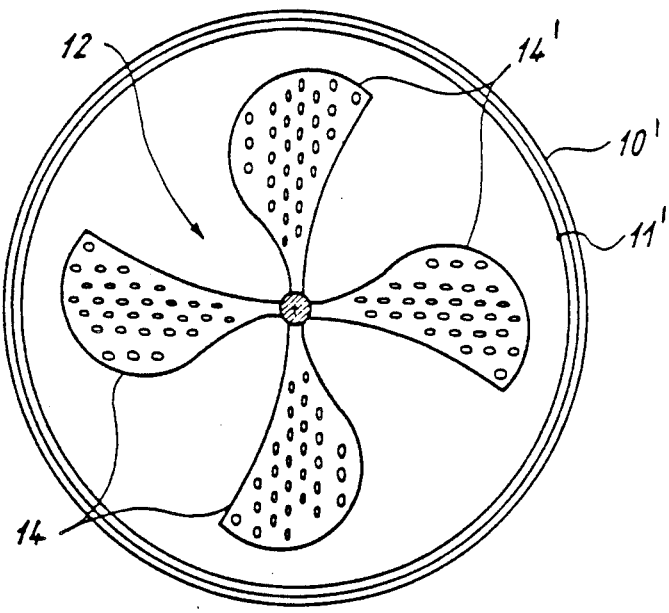
FIG. 4. is a sectional view along line IV—IV of FIG. 3.

FIGS. 3 and 4 show another embodiment for practicing the method of the present invention. In this embodiment the filter vessel 10' is cylindrical, similarly to the paper filter 11' placed therein in contrast to the pointed coneshaped filter vessel 10 and paper filter II as shown in FIG. 1. In addition, the shape of the agitator fin 14' of the agitator mechanism 12' is configured differently from the shape of the agitator fin 14 of the agitator mechanism 12 of the embodiment as shown in FIG. 1.

Similarly to the first embodiment, the shape of the agitator fin 14' of the embodiment shown in FIGS. 3 and 4 is so designed that the motion of the agitator mechanism 12 produces bubbles with the purpose of distributing the ground coffee in the water as evenly as possible and in order to attain the desired thorough removal of gas from the extract.

It is also possible to effect filtering of the extract by pouring the mixture out of the container and passing it through an appropriate filter.

The filter vessel may have a shape other than that of filter vessel 10 or 10', as long as all the coffee is exposed to the hot water at about the same time, and a thorough stirring of the mixture subsequently takes place.

Figure 5:
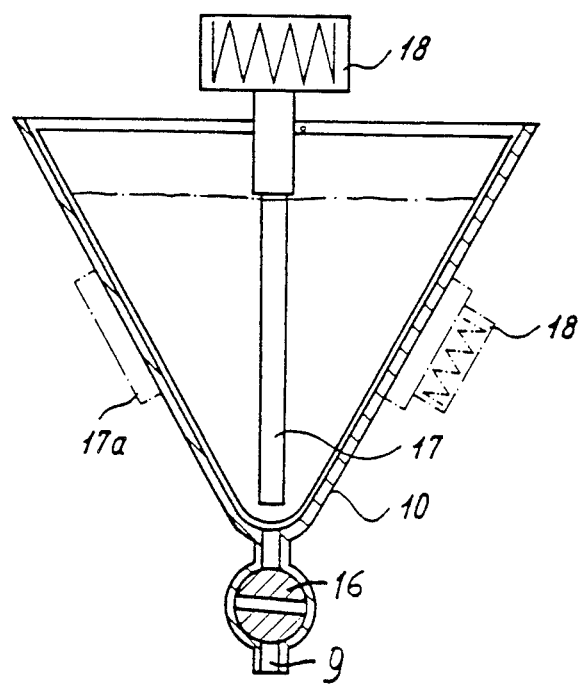
FIG. 5 is a schematic side elevational view of a device according to a further preferred embodiment of the invention.

FIG. 5 shows a schematic view of an embodiment of the present invention, in which the stirring of the ground coffee is effected by ultrasound waves.

The vessel 10 is provided with an ultrasound vibrator 17 which is activated by an ultrasound generator 18.

The rod-shaped vibrator 17 ensures that the mixture is kept agitated during the brewing time.

As FIG. 5 shows, a ring ultrasound vibrator 17a can also be used, (together with or alternatively to the rod-shaped vibrator) which is, for example, attached to the outer circumference of the vessel 10. It is also conceivable to have a ring ultrasound vibrator 17a attached to the inside of the vessel 10.

The ring ultrasound vibrator 17a is also activated by an ultrasound generator 18.

It has been found that a brewing time of from 6 to 15 minutes at brewing temperatures of approximately 70° C. is advantageous for executing the method of the present invention. However, other brewing times as well as other brewing temperatures are possible, depending primarily on the degree of fineness of the ground coffee as well as the amount of the extract to be produced.

The present disclosure relates to the subject matter disclosed in Federal Republic of Germany patent application No. P 37 15 165.7 filed on May 7th, 1987, the entire specification of which is incorporated herein by reference.

It will be understood that the above description of the present invention is susceptible to various modifications, changes and adaptations, and the same are intended to be comprehended within the meaning and range of equivalents of the appended claims.

What is claimed is:

1. A method for producing an aqueous extract from coffee, comprising the steps of:
    adding coffee to a vessel;
    adding heated water to said vessel;
    stirring a resulting coffee-water mixture during a predetermined brewing time to produce an even distribution of coffee in said mixture and to allow expulsion of gas from said mixture to effect in at least partial degassing thereof; and
    filtering said coffee-water mixture at the end of said predetermined brewing time to produce a filtered aqueous coffee extract.

2. A method as defined in claim 1, wherein the stirring step is effected mechanically.

3. A method as defined in claim 1, wherein the stirring step is effected by ultrasound waves.

4. A method as defined in claim 1, wherein each step is performed only once to produce a predetermined amount of extract.

5. A method as defined in claim 1, wherein said steps of adding heated water, stirring and filtering are performed repeatedly until a predetermined amount of the extract is produced.

6. A device for preparing an aqueous extract of coffee comprising:
    a vessel having an interior and an exterior, said interior adapted to hold a mixture of coffee and heated water;
    adding means to add heated water to said vessel;
    stirring means to agitate said mixture of coffee and water during a brewing period to produce an even distribution of coffee in said mixture and to allow expulsion of gas from said mixture of effect an at least partial degassing thereof; and
    filtering means to filter said mixture of coffee and water at the end of said brewing period to produce a filtered aqueous coffee extract.

7. A device as defined in claim 6, wherein the stirring means comprises a mechanical agitator, shaped to produce bubbles during stirring, extending into said vessel and driven by a motor.

8. A device as defined in claim 7, wherein said stirring means is arranged for rotation about an axis by said motor.

9. A device as defined in claim 8, wherein said stirring means is arranged for reciprocating motion along said axis by said motor.

10. A device as defined in claim 6, wherein the vessel further comprises outlet means to allow aqueous coffee extract to exit said vessel, and valve means in said outlet means to control said exit of the aqueous coffee extract from said vessel.

11. A device as defined in claim 10, wherein the filter means is disposed in the interior of said vessel between said mixture and said outlet means, to allow filtration of said mixture when said valve means is opened.

12. A device as defined in claim 11, wherein the filter means consists of filter paper.

13. A device as defined in claim 6, wherein the stirring means comprises an ultrasonic vibrator driven by an ultrasound generator.

14. A device as defined in claim 13, wherein said ultra-sonic vibrator is rod-shaped and extends into said coffee-water mixture.

15. A device as defined in claim 13, wherein said ultrasonic vibrator is attached to the exterior of said vessel.

16. A device as defined in claim 15, wherein said ultrasonic vibrator is ring-shaped and encircles the exterior of said vessel.

17. A device for producing an aqueous extract from coffee, comprising:
    means for adding coffee to a vessel;
    means for adding heated water to said vessel;
    means for stirring a resulting coffee-water mixture during a predetermined brewing time to produce an even distribution of coffee in said mixture and to allow expulsion of gas from said mixture to effect an at least partial degassing thereof; and
    means for filtering said coffee-water mixture at the end of said predetermined brewing time to produce a filtered aqueous coffee extract.

* * * * *